United States Patent Office 2,771,484
Patented Nov. 20, 1956

2,771,484

SULFONATION OF ORGANIC HYDROXY COMPOUNDS

Bruno Blaser, Dusseldorf-Urdenbach, and Gunther Tischbirek, Dusseldorf-Benrath, Germany, assignors to Henkel & Cie. G. m. b. H., Dusseldorf-Holthausen, Germany, a corporation of Germany No Drawing. Application September 14, 1953,
Serial No. 380,083

Claims priority, application Germany September 19, 1952

14 Claims. (Cl. 260—459)

This invention relates to and has as its object the sulfonation of organic hydroxy compounds, the hydroxyl groups are located at a non-aromatic carbon atom and preferably of such compounds of higher molecular weight. Because the hydroxyl group, reacting during the sulfonation, is of an alcoholic character, the organic hydroxy compounds are designated as alcohols through the specification.

In co-pending application, Serial No. 380,082, filed September 14, 1953 entitled Polyether Sulfuric Acid Addition Compounds, addition compounds of polyethers and the process for their production are described.

In this co-pending application, the polyethers contain at least three ether oxygen atoms in the polyether chain and the addition compounds have at least three sulfuric acid radicals molecularly bound to these ether oxygen atoms. In that case "sulfuric acid radical" is molecularly bound to the ether oxygen atoms by reacting a polyether having at least three ether radicals in one polyether chain with a sulfonating agent selected from the group consisting of chlorosulfonic acid, oleum, and sulfur trioxide. In this case the molecule of the sulfonating agent which adds onto the ether oxygen atoms is generically classified as the "sulfuric acid radical." The molecular bond between the ether oxygen atoms and the sulfuric acid radicals is relatively loose so that the sulfuric acid radicals may easily be split off again.

The polyether addition compounds used in the present case may be formed by contacting a polyether, i. e. an ether containing at least three ether oxygen atoms with a sufficient quantity of chlorosulfonic acid to form an addition compound with at least three chloro-sulfonic acid molecules individually molecularly bound to each of at least three separate ether oxygen atoms. Preferably polyethers containing up to 25–30 etheroxygen atoms in one polyether chain are used. The molecular weight of such a polyether chain may range from 150 up to 15,000. The number of chlorosulfonic acid molecules being molecularly bound to ether oxygen atoms, should range from 50–100% of the ether oxygen atoms present in the molecule, the number of ether oxygen atoms being, of course, sufficient to allow the presence of at least three such molecular bonds. The simplest of the polyethers which may be used are polyalkylene oxides as, for example, polyethylene oxide, polypropylene oxide or mixed polyethers. The hydrogen atoms of the hydroxyl groups present at the end of these polyether chains may be replaced in whole or in part by organic radicals so that the polyether chain terminates with an ether or ester group. The polyether chains may also contain hetero atoms such as sulfur or nitrogen atoms. It is also possible that several of such polyether chains be combined in a molecule. There may also be used as the starting polyethers capillary-active polyethers as, for example, polyethers of higher molecular alcohols or fatty acid esters of polyethers. The addition products form upon the contacting of the chlorosulfonic acid with the polyether. If the polyethers contain hydroxy groups or other groups which have a preferred reaction with the chlorosulfonic acid as, for example, amine or amide nitrogen atoms, such groups must first of all be completely saturated with the chlorosulfonic acid and the excess adding on the ether oxygen atoms. The maximum quantity of the chlorosulfonic acid which may be added after complete saturation of the groups having a preferred reaction is approximately equimolecular to the quantity of ether oxygen atoms i. e., one chlorosulfonic acid molecule for each ether oxygen atom present in the polyether.

The addition reaction takes place exothermically and may be effected at temperatures of $-50$ to $+60°$ C. and preferably at $-20$ to $+40°$ C. The polyether may, for example, be in molten form or in the presence of inert solvents. Such solvents are, for example, sulfur dioxide, carbon disulfide and certain chlorinated and/or fluorinated hydrocarbons such as trichlorethylene.

It has now been found, in accordance with the invention, that the above mentioned addition products of chlorosulfonic acid and polyethers are excellently suited for the sulfonation of alcohols of the aliphatic, cycloaliphatic or aliphatic aromatic series for the conversion thereof into the corresponding sulfuric acid semi-esters. The alcohols which may be sulfonated in accordance with the invention are preferably those containing 6 to 24 carbon atoms though the invention is not limited to these compounds. These compounds may be of an aliphatic or cycloaliphatic nature and may also contain aromatic radicals. The hydroxyl groups may be located at a primary or secondary carbon atom. These alcohols may be straight-chain or branch-chain, even numbered or odd numbered, saturated or unsaturated and may also contain several sulfonizable hydroxyl groups in the molecule.

Aliphatic alcohols with primary hydroxyl groups which may be used as starting material occur in nature as, for example, sperm oil or beeswax. They may also be prepared by reduction of natural or synthetic fatty acids, by catalytic reaction of carbon monoxide and hydrogen, by catalytic addition of carbon monoxide to straight chain or branched chain and cyclic olefines or may be isolated from the neutral oxidation products of paraffin oxidation. Such alcohols are, for example, octylalcohol, decylalcohol, dodecylalcohol, octadecylalcohol, etc. There may, furthermore, be used alcohols which contain one or more unsaturated bonds as, for example, are obtained by cleavage or reduction of sperm oil or other fatty acids of natural origin as, for example, castor oil or linseed oil.

Examples of primary alcohols with cyclic hydrocarbon radicals which may be sulfonated in accordance with the invention, include, hexahydrobenzylalcohols which may be substituted by aliphatic, cycloaliphatic or aromatic radicals. These materials may be obtained from the corresponding cyclohexanols by splitting off of water, catalytic addition of carbon monoxide and hydrogen to the cyclohexenes produced and possible reduction of the aldehydes formed upon the addition into the corresponding alcohols.

Alcohols with aromatic groups may also be sulfonated in accordance with the invention as, for example, benzylalcohol, alkylbenzylalcohols, methylolnapthalenes and others.

The hydroxyl groups which are to be sulfonated in accordance with the invention may be of a secondary nature. Secondary alcohols are obtained, for example, by ketonizing fatty acids or their salts and reducing the ketones produced. There may, furthermore, be used cyclic alcohols with secondary hydroxyl groups such as pre-hydrogenated aromatic hydroxyl compounds substituted by alkyl or cycloalkyl radicals.

The sulfonation is effected by mixing the reaction components in any desired sequence. The addition compounds used for the sulfonation are liquid to semisolid at normal temperatures. In the case of batch operations, it is advisable to cause the sulfonating agent, i. e. the addition compound, to flow into the alcohol, preferably with vigorous agitation. Due to the short reaction times required, the method is also suitable for continuous operation. In continuous operation, the reaction components, possibly in the presence of a still reacting or already completely reacted mixture, are brought together and the desired quantity ratio vigorously mixed. The quantity ratio of the reaction components depends on the degree of sulfonation of the alcohol which is desired. If the alcohol is to be only slightly sulfonated, as for example, in the case of emulsifiable alcohols, it is sufficient to use small quantities of sulfonating agent or large quantities of addition compounds of possibly capillarily active polyethers which contain only small quantities of added chlorosulfonic acid. If, on the other hand, an extensive sulfonation is desired, the quantity of sulfonating agent may be increased up to an excess of 5 to 20% over the quantity theoretically required to complete the sulfonation.

The sulfonation reaction may be facilitated by the use of a solvent, particularly when the reaction components are solid or very viscous or if the sulfonation is to be effected under particularly sparing conditions. Examples of solvents which may be used include liquid sulfur dioxide, carbon disulfide, ethylene chloride, perchlorethylene and other chlorinated and/or fluorinated hydrocarbons or mixtures of these solvents. If the sulfonating agent, i. e. the polyether addition compound was prepared in the presence of the solvent, the solvent may remain in the sulfonating agent during the sulfonation. The sulfonation in accordance with the invention may be carried out at temperatures between $-10-+60°$ C. and preferably $+20-+40°$ C. The reaction is exothermic and the heat may be removed in the conventional manner by external or internal cooling or by distilling off the solvent which may be present.

The reaction mixture may be neutralized with inorganic or organic bases as, for example, caustic soda solution, caustic potash solution, ammonia, triethanolamine, cyclohexylamine, pyridine, etc. In some cases, it is advisable to effect the neutralization with a base which has been cooled to temperatures between $-5-+20°$ C. directly after the sulfonation. This can be effected in a particularly easy manner in the case of continuous sulfonation by causing the reaction product to flow into the caustic solution or by continuously adding the neutralization agent to the reaction product.

The starting polyether addition product will be split during the sulfonation and the polyether freed of the added chlorosulfonic acid. The thus freed polyethers need not be separated from the reaction mixture. This constitutes a marked advantage as compared with conventional sulfonation methods using addition products of chlorosulfonic acid or sulfur trioxide in which the freed component of the addition product as, for example, low molecular ether had to be removed. The polyethers remaining in the reaction mixtures can favorably influence the properties of the sulfonation product. The neutralized sulfonation products obtained by the sulfonation in accordance with the invention have an excellent water solubility and form clear viscous pastes even in relatively high concentrations. Upon use of the pastes or preparations prepared therefrom as washing and cleaning agents, the presence of the polyethers furthermore has a favorable effect inasmuch as the washing and cleaning power of these agents is in part improved by the presence of the polyethers.

The sulfonation in accordance with the invention is superior in many ways to conventional sulfonation. Of special advantage is the fact that the double bonds present in the alcohol to be sulfonated will remain preserved to a far reaching extent during the sulfonation of secondary alcohols. In addition, the splitting off of water and the simultaneous formation of olefins, which readily occurs as a side reaction in conventional sulfonation of secondary alcohols, is substantially eliminated in accordance with the invention.

The following examples are given by way of illustration and not of limitation:

Example 1

To 36 grams of a polyethyleneglycol-monomethylether of an average molecular weight of 360, such as obtained by the action of ethylene oxide on monomethylglycol ether, 90 grams of chlorosulfonic acid are added while cooling with water and stirring well. At temperatures of 30 to 40° C. there is formed a colorless oily compound which is stable when protected from moisture.

To 86 grams oleylalcohol there are added in a 1.5 liter flask at temperatures of $+15$ to $+20°$ C. while cooling and with vigorous agitation, 74 grams of the above described chlorosulfonic acid polyether addition product. The oleylalcohol used in this and the following examples has the following characteristics:

Iodine number=81.5; hydroxyl number=204

Stirring is continued for a few minutes after the introduction of the addition product whereupon the mixture is immediately neutralized with ice cold caustic soda solution. There is obtained a completely colorless water soluble paste; the degree of sulfonation of the alcohol is about 97%. The alcohol recovered from the oleylalcohol sulfate by hydrolysis with dilute acid had an iodine number of 77.

Example 2

Twenty grams of a pulverized polyethylene oxide of a molecular weight of 5000 and 45 grams chlorosulfonic acid are mixed while cooling with tap water. This addition product is permitted to flow slowly, with vigorous agitation and external water cooling, into 91 grams of oleylalcohol. Immediately after the completion of the addition of the sulfonating agent, neutralization is effected by causing the reaction product to run into a previously prepared ice cold caustic soda solution. There is obtained a colorless water soluble paste. The degree of sulfonation is about 96 to 97%; the iodine number of the oleylalcohol obtained by hydrolysis of the sulfate is 78.

Example 3

As described in the previous example, 20 grams of a polyethylene oxide having an average molecular weight of 9000 are reacted with 45 grams chlorosulfonic acid. The slightly yellow addtion product obtained is carefully caused to flow (while stirring well and with external cooling) into 77 grams of a mixture of secondary alcohols (chain length $C_{13}$—$C_{17}$; acid number 0.1; hydroxyl number 241; iodine number 5) which has been obtained by ketonization of first run acids from paraffin oxidation with 7 to 9 carbon atoms in the molecule followed by catalytic hydrogenation. Immediately after the reaction components are brought together, neutralization is effected. There is obtained a practically colorless sulfonate paste which is of good water solubility.

Example 4

To 59.2 grams of an addition product of 8 to 9 mols. ethylene oxide on an aliphatic alcohol mixture of chain length $C_{12}$—$C_{18}$ which has been prepared by the reduction of cocoanut oil acid (hydroxyl number of the polyether 94.8) 81.6 grams chlorosulfonic acid are added so slowly, with good mixing and external water cooling of the reaction vessel that the temperature does not exceed $+35°$ C. A light yellow oil is obtained. The hydrochloric acid released upon the esterification of the end OH groups leads at times to the formation of a foam which can be eliminated by the application of a vacuum or gentle heating.

One hundred twelve grams of the light yellow addition product prepared in this manner are stirred within 4 to 5 minutes into 100 grams oleyl alcohol, the temperature being maintained by external water cooling at 25 to 30° C. After the introduction of the addition product, the stirring is continued for a further 1 or 2 minutes, whereupon neutralization is immediately effected with ice cold 20% caustic soda solution. The degree of sulfonation is 96%. There is produced a practically colorless, highly viscous paste which is an excellent washing agent.

Example 5

To 53 grams of an addition product of about 10 mols ethylene oxide on a coconut oil acid amide of a chain length $C_{12}$—$C_{18}$, there are added while stirring well and cooling moderately, 116 grams of chlorosulfonic acid. The temperature in this connection should not exceed +40° C. After expulsion of the hydrochloric acid released upon the esterification of the end OH group, there is obtained an orange oil which contains bound in the form of an addition product about 90% of the chlorosulfonic acid which was used.

Ninety-five grams of the orange addition product prepared in this manner are stirred at 25 to 30° C. within a period of five minutes into 100 grams oleylalcohol; the stirring is continued for a further five minutes whereupon neutralization with 20% caustic soda solution is effected. There is produced light yellow viscous paste which forms a clear solution in water.

Example 6

In accordance with the method set forth in Example 1, an addition product is prepared from 45 grams of a polyglycol-monomethylether of a hydroxyl number of 125 and 70 grams chlorosulfonic acid at temperatures of 40° C. Seventy-five grams of finely powdered coconut fatty acid monoethanolamide of a hydroxyl number of 261 is gradually stirred at 35 to 40° C. with continuous vigorous stirring into the clear, practically colorless addition product. The ethanolamide was prepared from a mixture of fatty acids having 10 to 18 carbon atoms. After about 5 minutes, deposits of solid portions are observed which can lead, with a decrease in temperature, to complete consolidation of the reaction product. After neutralization of the reaction product with 20% caustic soda solution, there is obtained a clear colorless paste of high degree of sulfonation and good washing properties.

Example 7

Forty-five grams of the polyglycol-monomethylether mentioned in the preceding example are converted in the manner described therein with 81 grams of chlorosulfonic acid into an addition product with good mixing and cooling. Thereupon, 160 grams dodecylcyclohexanol are added to the clear, practically colorless addition product. The reaction mixture is vigorously stirred and maintained by cooling at temperatures of 30 to 40° C. After the reaction components have been brought together, the stirring is continued for a further 5 minutes and the reaction product is neutralized with ice cold 20% caustic soda solution. There is obtained a practically colorless paste which forms a clear solution and has good foaming and washing properties. The degree of sulfonation of the alcohol is about 97%.

Example 8

An addition product is prepared in accordance with the method of the previous example using the same quantities of polyglycolmonomethylether and chlorosulfonic acid. The addition product is stirred at temperatures of 25 to 30° C. into 150 grams castor oil. After the introduction of the addition product, the stirring is continued for approximately a further 5 minutes and the yellowish-brown product obtained is neutralized in ice cold 20% caustic soda solution. There is obtained a yellowish paste which forms a clear solution and is of high wetting and foaming power.

Example 9

Seventy-three grams of an addition product of about 12 mols ethylene oxide on a dodecylmercaptan are dissolved in 150 milliliters 1.2-dichlorethane and thereupon 139 grams chlorosulfonic acid are added with agitation and cooling to temperatures of 20 to 30° C.

A solution of 250 grams dodecylcyclohexanol in 250 milliliters 1,2-dichlorethane is slowly added to the colorless reaction product produced, at temperatures of −10° C. After the introduction, stirring is continued for 2 minutes at room temperature whereupon neutralization is effected with ice cold 20% caustic soda solution and the solvent is removed after the addition of some isopropylalcohol. The aqueous phase is then free from isopropylalcohol on a steam bath. There is obtained a colorless paste, which, in aqueous solution, has excellent foaming and washing properties. The polyether addition compounds prepared in accordance with the following examples may be used as sulfonating agents in the same manner as described in the preceding Examples 1–9.

Example 10

To 30 grams of a polyethylene oxide having an average molecular weight of 300 and the general formula:

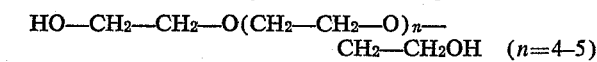

HO—$CH_2$—$CH_2$—O($CH_2$—$CH_2$—O)$_n$—$CH_2$—$CH_2$OH  ($n=4$–5)

there are added 70 grams chlorosulfonic acid with good agitation. The reaction heat given off is led away by cooling so that the temperature does not exceed 30° C. A practically colorless oily compound is formed which contains the greatest part of the chlorosulfonic acid in the form of the addition compound which can easily be split off.

Example 11

To 68 grams of an end methyl etherified addition product of about 10 mols ethylene oxide on the alcohol mix mentioned in Example 4, there are slowly added with stirring and cooling 116 grams chlorosulfonic acid. There is produced a practically colorless oil which contains almost the entire chlorosulfonic acid bound in the form of an addition product. Upon dissolving the product in water, the addition product is split and the initial polyether is again obtained.

Example 12

Sixty-two grams of an addition product of 5–6 mols ethylene oxide on an alkylbenzol sulfamide, which has been prepared from a technical alkylbenzol mixture with 14–18 carbon atoms in the alkyl radical, are dissolved in 200 milliliters liquid sulfur dioxide and 58 grams of chlorosulfonic acid are slowly added while stirring. The reaction heat produced is removed by boiling the sulfur dioxide. After evaporation of the remaining sulfur dioxide, there remains an orange oil which is only slightly sulfonated in the benzene nucleus and contains the greatest part of the chlorosulfonic acid bound in the form of an addition product.

We claim:
1. Process for the sulfonation of organic hydroxy compounds, the hydroxy groups being located at non-aromatic carbon atoms which comprises intimately contacting said hydroxy compounds with a polyether chlorosulfonic acid addition compound containing individual chlorosulfonic acid molecules molecularly bound to at least 3 ether oxygen atoms present in the polyether and recovering a sulfonated organic hydroxy compound.

2. Process according to claim 1 in which said hydroxy compound is a high molecular alcohol.

3. Process according to claim 1 in which said alcohol contains 6 to 24 carbon atoms.

4. Process according to claim 3 in which said alcohol is an unsaturated alcohol.

5. Process according to claim 4 in which said alcohol is oleylalcohol.

6. Process according to claim 1 in which said alcohol is a secondary alcohol.

7. Process according to claim 6 in which said alcohol is an unsaturated alcohol.

8. Process according to claim 1 in which said intimate contacting is effected at a temperature of about $-10$ to $+60°$ C.

9. Process according to claim 8 in which said contacting is effected at a temperature of about 20 to 40° C.

10. Process according to claim 1 in which said contacting is effected in the presence of an inert solvent.

11. Process according to claim 10 in which said solvent is a solvent present from the formation of the sulfonating polyether chlorosulfonic acid addition compound.

12. Process according to claim 1 in which said recovery includes neutralization at a temperature of $-5$ to $+20°$.

13. Process according to claim 1 in which said sulfonated hydroxy compound is recovered in the presence of polyether formed during the contacting.

14. Process according to claim 1 in which said addition compound is derived from a polyglycolether of a molecular weight between 300 and 10,000 and in which the number of molecularly bound chlorosulfonic acid molecules present is 50 to 100% of the ether oxygen atoms present in the polyglycolether.

References Cited in the file of this patent

UNITED STATES PATENTS 1,931,491   Haussman _____ Oct. 24, 1933